(12) United States Patent
Tu et al.

(10) Patent No.: US 7,136,171 B2
(45) Date of Patent: Nov. 14, 2006

(54) METHOD FOR THE EXTRACTION OF IMAGE FEATURES CAUSED BY STRUCTURE LIGHT USING TEMPLATE INFORMATION

(75) Inventors: Peter Henry Tu, Schenectady, NY (US); Glen William Brooksby, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 719 days.

(21) Appl. No.: 09/683,369

(22) Filed: Dec. 19, 2001

(65) Prior Publication Data

US 2003/0113020 A1    Jun. 19, 2003

(51) Int. Cl.
G01B 11/24 (2006.01)
G01B 11/30 (2006.01)

(52) U.S. Cl. .................. 356/611; 382/154; 382/275

(58) Field of Classification Search ........ 382/260–264, 382/103; 356/604, 611; 372/38.08
See application file for complete search history.

(56) References Cited

U.S. PATENT DOCUMENTS

| | | | | |
|---|---|---|---|---|
| 4,263,508 A | * | 4/1981 | Leary et al. | 250/358.1 |
| 4,504,908 A | * | 3/1985 | Riederer et al. | 600/431 |
| 4,654,872 A | * | 3/1987 | Hisano et al. | 382/154 |
| 4,701,049 A | * | 10/1987 | Beckman et al. | 356/3.07 |
| 4,803,645 A | * | 2/1989 | Ohtomo et al. | 702/167 |
| H000616 H | * | 4/1989 | Hartman | 359/561 |
| 4,825,394 A | * | 4/1989 | Beamish et al. | 356/147 |
| 4,834,530 A | * | 5/1989 | Murai et al. | 356/2 |
| 4,869,574 A | * | 9/1989 | Hartman | 359/561 |
| 5,179,441 A | * | 1/1993 | Anderson et al. | 348/43 |
| 5,231,401 A | * | 7/1993 | Kaman et al. | 342/55 |
| 5,317,582 A | * | 5/1994 | Siebert | 372/25 |
| 5,357,281 A | * | 10/1994 | Ikeda et al. | 375/240.12 |
| 5,420,872 A | * | 5/1995 | Hyodo et al. | 714/747 |
| 5,446,548 A | * | 8/1995 | Gerig et al. | 356/620 |
| 5,576,827 A | * | 11/1996 | Strickland et al. | 356/336 |
| 5,581,383 A | * | 12/1996 | Reichel et al. | 349/116 |
| 5,589,942 A | * | 12/1996 | Gordon | 356/611 |
| 5,598,488 A | * | 1/1997 | Poggio et al. | 382/278 |
| 5,621,529 A | * | 4/1997 | Gordon et al. | 356/604 |
| 5,655,033 A | * | 8/1997 | Inoguchi et al. | 382/293 |
| 5,682,198 A | * | 10/1997 | Katayama et al. | 348/47 |
| 5,691,808 A | * | 11/1997 | Nourrcier et al. | 356/5.01 |
| 5,740,801 A | * | 4/1998 | Branson | 600/407 |
| 5,767,983 A | * | 6/1998 | Terashita | 358/302 |
| 6,081,606 A | * | 6/2000 | Hansen et al. | 382/107 |
| 6,236,748 B1 | * | 5/2001 | Iijima et al. | 382/154 |
| 6,754,398 B1 | * | 6/2004 | Yamada | 382/260 |
| 6,829,371 B1 | * | 12/2004 | Nichani et al. | 382/103 |

OTHER PUBLICATIONS

Arman et al., "Model-Based Object Recognition in Dense-Range", Mar. 1993, ACM Computing Surveys, vol. 25, No. 1, pp. 1-43.*

(Continued)

*Primary Examiner*—Samir Ahmed
*Assistant Examiner*—Sath V Perungavoor
(74) *Attorney, Agent, or Firm*—Fletcher Yoder

(57) ABSTRACT

A method for use with a non-contact range finding and measurement system for generating a template guide representative of the surface of a observed object, and for utilizing the template guide to improve laser stripe signal to noise ratios and to compensate for corrupted regions in images of the observed object to improve measurement accuracy.

19 Claims, 3 Drawing Sheets

OTHER PUBLICATIONS

Fisher, R. B., Naidu, D. K., "A Comparison of Algorithms for Subpixel Peak Detection", in Sanz (ed.) Advances in Image Processing, Multimedia and Machine Vision, Springer-Verlag, Heidelberg, 1996.*

Davis, J., Chen, X., "A Laser Range Scanner Designed for Minimum Calibration Complexity", 3-D Digital Imaging and Modeling, 2001. Proceedings. Third International Conference on, 2001, ISBN: 0-7695-0984-3.*

Trucco, E. and Fisher, R.B., 1994, "Acquisition of consistent range data using local calibration", Proceeding IEEE Int. Conference on Robotics and Automation, (IEEE Comp.Soc. Press, Los Alamitos), pp. 3410-3415, 1994.*

Fang, H., Nurre, J., "Smoothing Random Noise from Human Head Scan Data", IEEE transactions on medical imaging, vol. 15 No. 1, 1996.*

Kevin Harding & D. Svetkoff, "3D Laser Measurements On Scattering And Translucent Surfaces", SPIE Proceedings vol. 2599, Three-dimensional and Unconventional Imaging for Industrial Inspection and Metrology, editor Harding, Phil. Oct. 1995, pp. 217-227.

Kevin Harding, "Speckle Reduction Methods for Laser Line Gages", Proceedings, SPIE vol. 3204, editor K. Harding, pp. 137-144, (1997).

* cited by examiner

METHOD FOR THE EXTRACTION OF IMAGE FEATURES CAUSED BY STRUCTURE LIGHT USING TEMPLATE INFORMATION

BACKGROUND OF INVENTION

The present invention relates to a system for observing objects in three dimensional space using structured light. More particularly, the invention relates to a multi-camera, three dimensional sensing system for providing non-contact gauge measurements of an object using known object templates and known epi-polar geometry to identify observable projections of structured light on the surface of an object, and to reconstruct corrupted portions of the projected structured light. The resulting set of data points is then compared with a set of predetermined ideal shape information data points, or a reference model, to identify gauge measurements of the object.

Measurement systems such as laser range finders, illuminate an object undergoing measurement using structured light. Reflections of the structured light projected on the surface of the object are captured by two or more calibrated cameras, generating images of the illuminated portions of the object's surface. In some applications, the structured light is in the form of a set of laser planes. Where the laser planes intersect the surface of the object, a striping effect is achieved. By detecting these laser light stripes in the images of the object's surface, point correspondences can be established and triangulation techniques employed to reconstruct a representation of the surface of the object.

First, a single pixel of each stripe in an images from a first camera is selected. Given that the position of the first camera lens in space is known and the selected pixel is known, then it is known that the point corresponding to the selected pixel lies on a known line drawn from the lens center out into space. This line appears as a line in an image from a second camera. This line is called the epi-polar line of the selected point in the first image. Since the position of the lens center of the second camera is also known, this epi-polar line can be calculated and drawn in the second image. The epi-polar line, when drawn in the second image, will intersect at least one, and most likely several, of the stripes of the second video image. It is known that one of the pixels where the epi-polar line and a stripe intersect represents the selected point in the first image. The actual coordinate location in space of the point corresponding to any of these intersection points is determined by simple triangulation. Since the position in space of each plane of light which created the stripes is also known, the single point of all the intersection points which correspond to the selected point in the first image is ascertained by determining the three-dimensional coordinate of each intersection point to determine if it lies on one of the known planes of light. The intersection point which lies closest to a known plane of light is taken as the selected point.

The surface of many objects includes regions which are shiny or have otherwise poor reflectivity characteristics. Structured light projected onto these surfaces can result in multiple reflections or clutter which, in turn, results in poor laser stripe identification in the resulting images obtained by the cameras. Furthermore, in some situations, entire image regions which are representative of portions of an objects surface may become corrupted due to noise or interference.

Accordingly, there is a need for a method to enhance laser stripe identification in images, and for a method of reconstructing laser stripes in those portions of images which are heavily corrupted due to noise or interference.

SUMMARY OF INVENTION

Briefly stated, the present invention sets forth a method for generating a template guide representative of the surface of an object, and for utilizing the template guide to improve laser stripe signal to noise ratios and to compensate for corrupted image regions, thereby improving the accuracy of current laser range finding and measurement systems.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

If repeated measurements of objects of the same type are performed, a set of canonical images can be generated so that the laser stripes in each image can be identified manually. This process results in a set of templates which are representative of the surface of similar objects. Subsequent scans of similar objects will have similar laser striping patterns, with any deviations due to variations in the object surface morphology. The template structures represent prior knowledge of the surface of the objects, such that features in subsequent images which are inconsistent with the expected results, as represented by the templates, can be ignored or de-emphasized.

Figure 1:
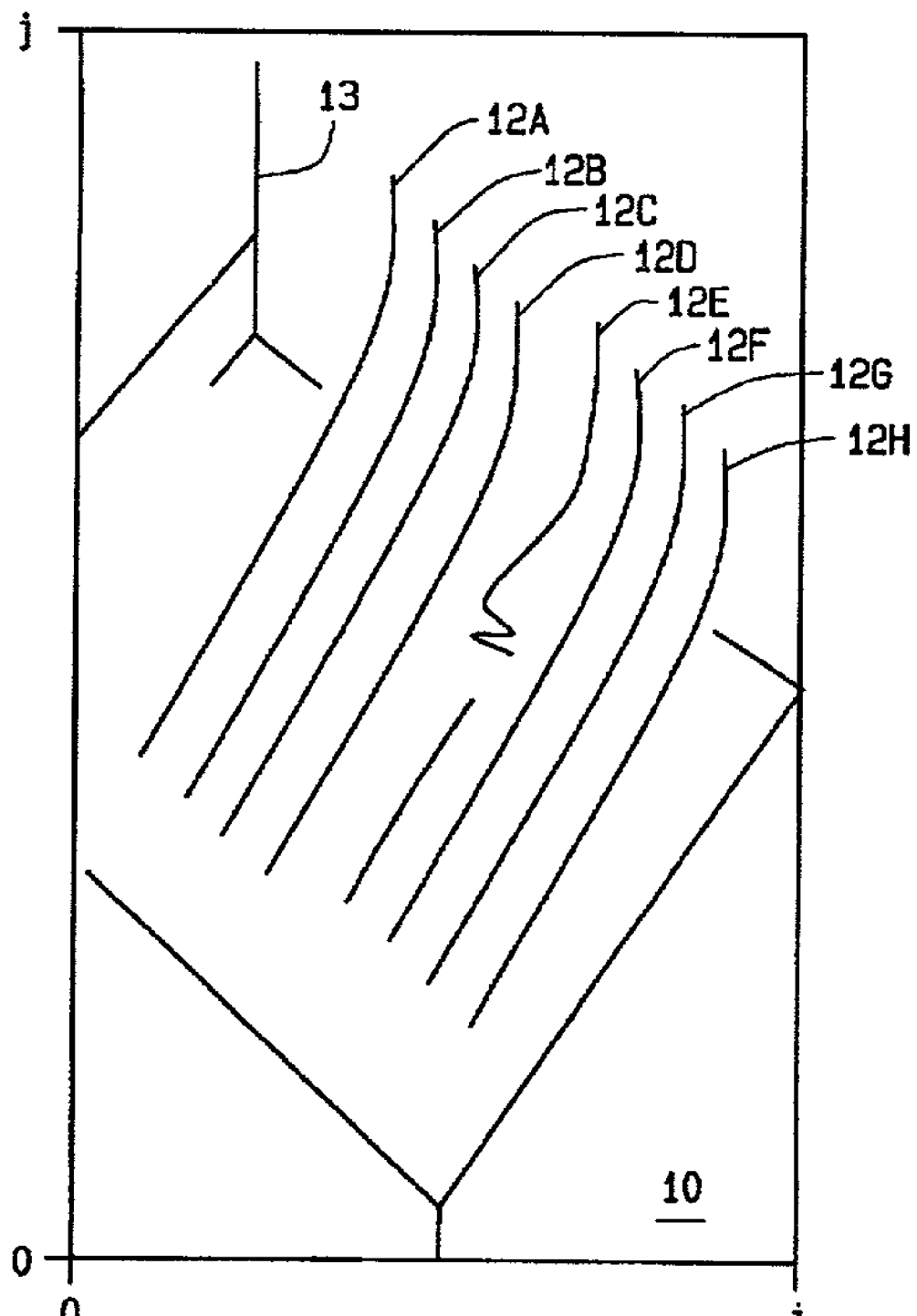
FIG. 1 is a simplified view of a image of laser stripes projected on a surface of an object, including both coherent and corrupted regions.
Figure 3:
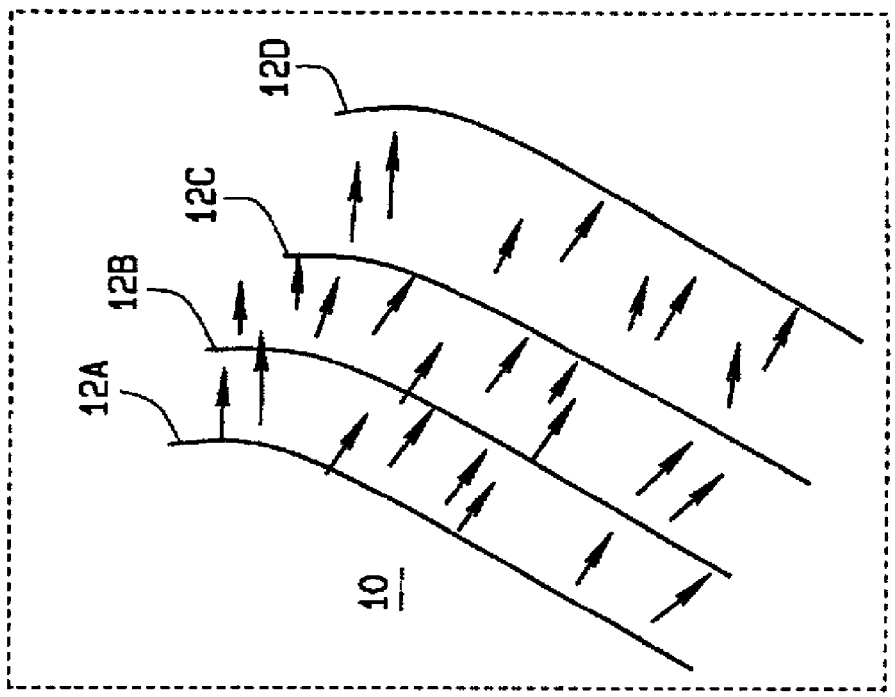
FIG. 3 is a simplified diagram of a perpendicular flow field for a portion of the image shown in FIG. 1.
Figure 2:
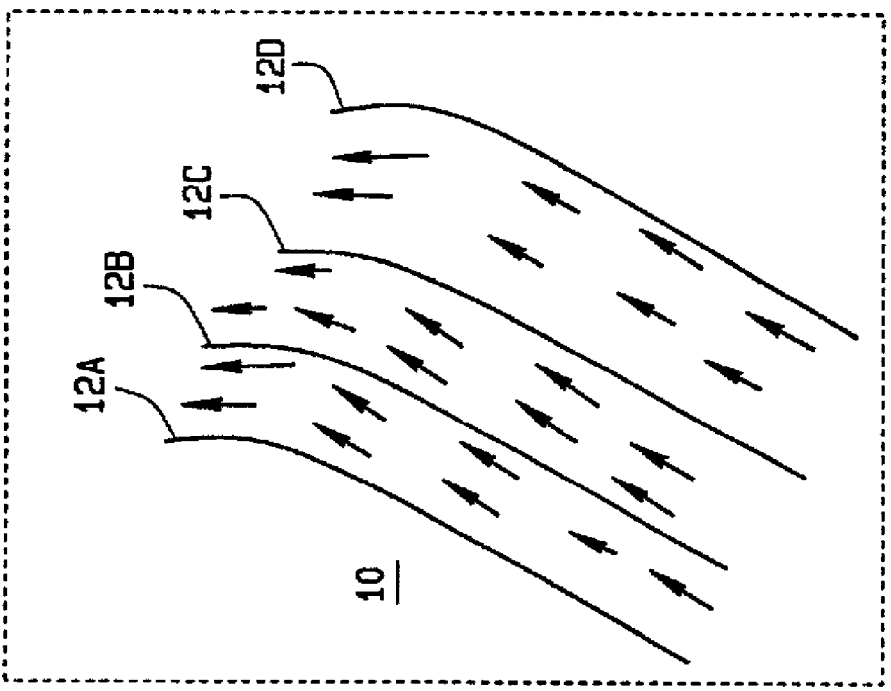
FIG. 2 is a simplified diagram of a tangential flow field for a portion of the image shown in FIG. 1.

Templates can be used in various ways to increase the fidelity of the laser stripe localization process. By using the templates as a guide, a two-dimensional locally matched filter may be generated for each point in an image 10 of projected laser stripes 12A–12H on the surface of an object 13, such as shown in FIG. 1. Next, a flow field is established which defines an orientation for each point in an image. A flow field may be either a tangential flow field, as seen in FIG. 2, or a perpendicular flow field, as seen in FIG. 3. Each arrow shown in FIGS. 2 and 3 represents the assigned flow for a given pixel comprising the image.

The flow field is generated using the templates by way of an orientation diffusion processes, such as, but not limited to, interpolation methods and relaxation methods.

The filtering is done in two passes. In the first pass, each pixel (i,j) in an image 10 is given the value:

$$v(i, j) = \sum_R (\text{image}(r) \times \text{gaussian}(r))$$

where R is a curve which emanates from pixel (i,j) and is always tangential to the flow field, r is a measure of arc length along curve R, and image(r) is the image intensity value for a point on curve R. The gaussian term localizes this one dimensional filter.

In the second pass, each pixel (i,j) is given the value:

$$t(i, j) = \sum_P (v(p) \times \text{gaussian}(p))$$

where P is a curve emanating from pixel (i,j) and is always perpendicular to the flow field, and p is a measure of arc length along curve P. The result of this two pass approach is a two-dimensional local matched filter responsive to the original image 10. The matched filtering enhances much of the true signal while suppressing unwanted noise.

Once an image 10 has been processed with the filters, non-maximal suppression techniques are utilized to identify the center of each laser stripe 12A–12H. In one embodiment, each raster line in an image 10 is scanned to identify points where t(i,j) is a local maximum with respect to the raster line. These points represent the detected laser stripe structure. In this way, the laser stripe signal to noise ratio is increased, resulting in an increase in measurement accuracy.

Alternatively, a single pass approach could also be used by employing a single two-dimensional filter. Or, separable one-dimensional filters which are non-gaussian could also be employed within the scope of the invention.

Figures 4, 5:
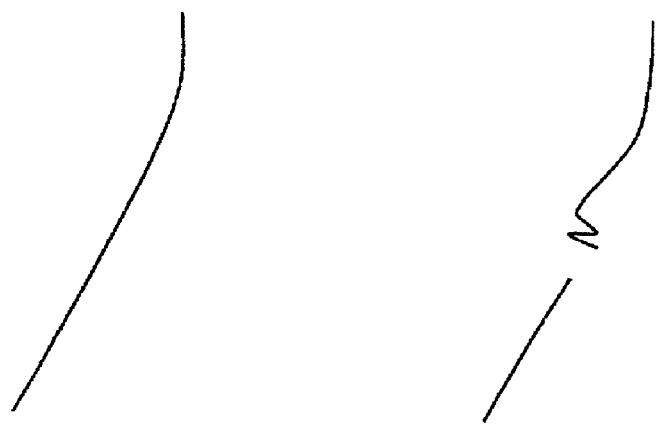
FIG. 4 is a simplified view of a single laser stripe from an uncorrupted image region.
FIG. 5 is a simplified view of a single laser stripe from a corrupted image region.

Due to problems associated with reflections and laser specularity, a region or laser stripe in image 10 may become corrupted. For example, as seen in FIG. 1, laser stripe 12E is corrupted and discontinuous. To determine if a local region of an image 10 is corrupted by either reflections or laser specularity, pixels (i,j) of the image 10 which are representative of local maxima, or zero-crossings, are identified. If pixels (i,j) representative of local maxima in a region are in a structured pattern, i.e. form a line or are "chained", such as seen in laser stripes 12A–12D, 12F–12H, and FIG. 4, the region is considered to be coherent and not corrupted. Alternatively, if there are no pixels (i,j) representative of local maxima in a region, or if the representative pixels (i,j) do not form a structured pattern, i.e., are incoherent as seen in laser stripe 12E and FIG. 5, the region is marked as corrupted.

Figure 6:
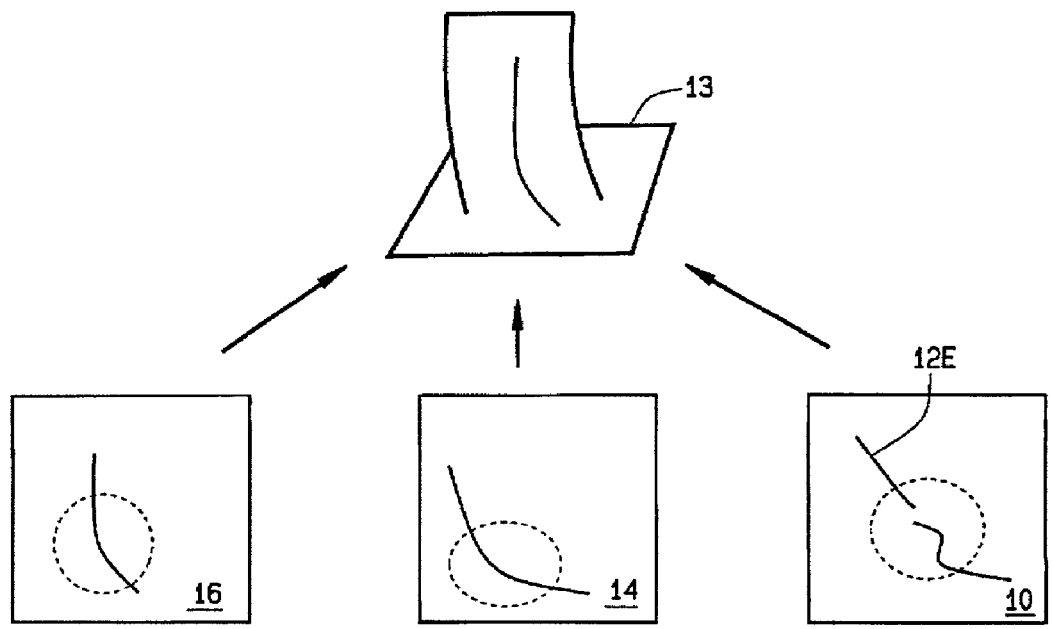
FIG. 6 is a collection of three images of a single laser stripe projected on a surface of an object, as seen from three individual cameras.

Using the generated template structure and known epipolar geometry, the corresponding laser stripes in non-corrupted regions of the image 10 can be readily identified. Next, as seen in FIG. 6, by using triangulation and projection techniques from multiple view of the object 13, the one or more laser stripes such as 12E in the corrupted regions of the image 10 can be synthesized by using corresponding uncorrupted laser lines in different images 14 and 16.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for identifying images of laser stripes projected onto the surface of an object in a non-contact gauge measurement system, comprising:
    identifying a type of object to be imaged and based on the object type generating a template, the template representing an expected laser striping pattern and a local orientation or flow field at each point in images for each of a plurality of cameras, the template being based on prior knowledge of the surface of the object;
    projecting one or more laser stripes onto a surface of the object;
    obtaining an image of said projected laser stripes;
    generating a matched filter for each pixel in said image from the template;
    filtering said image with said generated matched filter along curves, wherein the curves are either parallel or perpendicular to the orientation of respective flow fields, such that the filter correlates the laser stripes to an expected laser striping pattern and orients filtering according to an expected local orientation or flow field; and
    identifying the center of said projected laser stripes in said filtered image.

2. The method of claim 1 for identifying images of laser stripes wherein the step of generating a matched filter for each pixel in said image includes the step of calculating:

$$v(i, j) = \sum_R (\text{image}(r) \times \text{gaussian}(r))$$

for each pixel (i,j) in said image, wherein image(r) is the image intensity value for a point on a curve R that emanates from pixel (i,j), and is always tangential to a flow field.

3. The method of claim 2 for identifying images of laser stripes wherein the step of generating a matched filter for each pixel in said image includes the step of calculating:

$$t(i, j) = \sum_P (v(p) \times \text{gaussian}(p))$$

for each pixel (i,j) in said image, wherein P is a curve that emanates from pixel (i,j), and is always perpendicular to the flow field.

4. The method of claim 3 for identifying images of laser stripes wherein the step of identifying the center of said projected laser stripes in said filtered image includes, for each raster line in said image, identifying pixels where t(i,j) is a local maximum with respect to said raster line.

5. The method of claim 1 for identifying images of laser stripes wherein the step of generating a matched filter for each pixel in said image calculates a two-dimensional matched filter for each pixel in said image.

6. The method of claim 1 for identifying images of laser stripes wherein the step of generating a matched filter for each pixel in said image includes calculating a first one-dimensional filter for each pixel and calculating a second one-dimensional filter for each pixel.

7. The method of claim 6 for identifying images of laser stripes wherein said first and second one-dimensional filters are each separable gaussian filters.

8. The method of claim 6 for identifying images of laser stripes wherein said first and second one-dimensional filters are each separable non-gaussian filters.

9. The method of claim 1, further comprising determining one or more corrupted laser stripes in said filtered image.

10. The method of claim 9, wherein the step of determining said corrupted laser stripes include identifying incoherent pixels or no pixels in said projected laser stripes.

11. The method of claim 9, further comprising synthesizing said corrupted laser stripes based on corresponding uncorrupted laser stripes in other images.

12. A method for identifying images of laser stripes projected onto the surface of an object in a non-contact gauge measurement system, comprising:

identifying a type of object to be imaged and based on the object type generating a template, the template representing an expected laser striping pattern and a local orientation or flow field at each point in images for each of a plurality of cameras, the template being based on prior knowledge of the surface of the object;

projecting one or more laser stripes onto a surface of the object;

obtaining an image of said projected laser stripes;

generating a matched filter for each pixel in said image from said template by calculating:

(a)
$$v(i, j) = \sum_R (\text{image}(r) \times \text{gaussian}(r))$$

and (b)
$$t(i, j) = \sum_P (v(p) \times \text{gaussian}(p))$$

for each pixel (i,j) in said image, wherein image(r) is the image intensity value for a point on a curve R that emanates from pixel (i,j) and is always tangential to a flow field, and P is a curve that emanates from pixel (i,j) and is always perpendicular to the flow field;

filtering said image with said generated matched filter along curves, wherein the curves are parallel and perpendicular to the orientation of respective flow fields, such that the filter correlates the laser stripes to an expected laser striping pattern and orients filtering according to expected local orientation or flow field; and identifying the center of said projected laser stripes in said filtered image.

13. The method of claim 12, wherein the step of identifying the center of said projected laser stripes in said filtered image includes, for each raster line in said image, identifying pixels where t(i,j) is a local maximum with respect to said raster line.

14. The method of claim 12, wherein the step of generating a matched filter for each pixel in said image includes calculating a two-dimensional matched filter for each pixel in said image.

15. The method of claim 12, wherein the step of generating a matched filter for each pixel in said image includes calculating a first one-dimensional filter and a second one-dimensional filter for each pixel in said image.

16. The method of claim 15, wherein said first and said second one-dimensional filters are each separable gaussian or non-gaussian filters.

17. A method for identifying images of laser stripes projected onto the surface of an object in a non-contact gauge measurement system, comprising:

identifying a type of object to be imaged and based on the object type generating a template, the template representing an expected laser striping pattern and a local orientation or flow field at each point in images for each of a plurality of cameras, the template being based on prior knowledge of the surface of the object;

projecting one or more laser stripes onto a surface of the object;

obtaining a two-dimensional image of said projected laser stripes;

generating a matched filter for each pixel in the image from the template: filtering the image with the generated matched filter along curves, wherein the curves are either parallel or perpendicular to the orientation of respective flow fields, such that the filter correlates the laser stripes to an expected laser striping pattern and orients filtering according to expected local orientation or flow field;

identifying incoherent pixels or no pixels in said projected laser stripes; and determining one or more corrupted laser stripes in said image based on the identification.

18. The method of claim 17, further comprising synthesizing said corrupted laser stripes based on corresponding uncorrupted laser stripes in other images.

19. The method of claim 18, further comprising identifying said corresponding uncorrupted laser stripes in other images based on a epi-polar geometry and a template structure.

* * * * *